United States Patent

Bacchus et al.

[11] Patent Number: 6,110,375
[45] Date of Patent: Aug. 29, 2000

[54] PROCESS FOR PURIFYING WATER

[75] Inventors: Mohammed F. Bacchus, Sanfrancisco, Calif.; Bruce M. Dawson, Westford; Gary A. O'Neill, Tyngsboro, both of Mass.

[73] Assignee: Millipore Corporation, Bedford, Mass.

[21] Appl. No.: 08/179,861

[22] Filed: Jan. 11, 1994

[51] Int. Cl.$^7$ ................................................. B01D 61/00
[52] U.S. Cl. ................. 210/652; 210/681; 210/688; 210/900; 210/805; 210/195.2; 210/257.2
[58] Field of Search ..................... 210/652, 681, 210/805, 807, 195.2, 257.2, 900, 688

[56] References Cited

U.S. PATENT DOCUMENTS

| | | | |
|---|---|---|---|
| 4,156,621 | 5/1979 | Andrews et al. | 210/652 |
| 4,206,048 | 6/1980 | Guter | 210/652 |
| 4,276,177 | 6/1981 | Smith | 210/195.2 |
| 4,784,763 | 11/1988 | Hambleton et al. | 210/195.2 |
| 4,787,980 | 11/1988 | Ackermann et al. | 210/652 |
| 4,808,287 | 2/1989 | Hark | 210/257.2 |
| 5,087,370 | 2/1992 | Schultheis et al. | 210/638 |
| 5,282,972 | 2/1994 | Hanna et al. | 210/652 |

FOREIGN PATENT DOCUMENTS 2207868   6/1974   France .

OTHER PUBLICATIONS

Water and waste water technology, $2^{nd}$ Ed. Mark. J. Hammer, John Wiley & Sons, pp. 287–290.
Derwent abstract 68292V.

*Primary Examiner*—Ana Fortuna
*Attorney, Agent, or Firm*—J. Dana Hubbard, Esq.; Timothy J. King, Esq.; Paul J. Cook, Esq.

[57] ABSTRACT

Water to be purified is passed through a reverse osmosis step to produce a pure water stream and a waste water stream. The waste water is directed to a deionization step to produce purified deionized water which is recycled to the reverse osmosis step. The process directs far less water to waste as compared to conventional reverse osmosis processes. The process also produces water of higher organic and inorganic purity than can be obtained by either reverse osmosis or deionization alone.

9 Claims, 5 Drawing Sheets

PROCESS FOR PURIFYING WATER

BACKGROUND OF THE INVENTION

This invention relates to a process and system for producing purified water utilizing reverse osmosis. More particularly, this invention relates to a process and system for purifying water by reverse osmosis followed by deionization of waste water from the reverse osmosis step in a manner which conserves water.

At the present time a reverse osmosis step is used to remove impurities, primarily microorganisms, pyrogens and ionic material from water by utilizing a reverse osmosis membrane. Usually, reverse osmosis is conducted by contacting the incoming water tangentially to the membrane so that the waste water comprising the retentate washes the membrane to reduce accumulation of impurities retained on the membrane during use. As sparingly soluble salts are concentrated in the concentrate (waste) stream, their concentrations must be kept low so as to prevent precipitation of the least soluble species thereby to maintain the membrane surface free of colloidal and particulate matter. The fraction of the total water which comprises the retentate varies depending on the quality of feed water, desired product quality and the type of membrane material employed in the reverse osmosis unit. In a common mode of single stage operation, between about 80 and 90% of the incoming water to the reverse osmosis step washes the upstream surface of the reverse osmosis membrane and is removed as retentate or waste. The remaining portion of the incoming water passes through the reverse osmosis membrane as purified water. This mode of operation, wherein a large percentage of the water constitutes reject water previously has been thought to be necessary in order to prevent premature plugging of the reverse osmosis membrane.

At the present time, 80 to 90% loss of water is considered unacceptable particularly in geographical areas where water is increasingly in short supply. A process which utilizes a reverse osmosis step is disclosed in U.S. Pat. No. 5,156,739 and which directs a large proportion of feed water to waste. Accordingly, it would be desirable to provide a means for effecting reverse osmosis treatment of water while avoiding high losses of waste water.

SUMMARY OF THE INVENTION

The present invention provides a process for purifying water which includes a reverse osmosis step and which eliminates wasting water at high rates. At the reverse osmosis step, a purified water stream and an unpurified water stream are produced. The unpurified water stream is directed to a deionization step to produce deionized water which then is recycled either alone or admixed with feed water to the reverse osmosis step. Periodically, a portion of the unpurified water stream from the reverse osmosis step is sent to waste. The portion of the incoming feed water sent to waste is less than about 20% of the incoming feed. Feed water can be pretreated to remove impurities prior to the reverse osmosis step. Purified water from the reverse osmosis step also can be purified further such as by ultrafiltration or UV radiation.

DESCRIPTION OF SPECIFIC EMBODIMENTS

Water to be purified typically tap water, is directed to a purification system which includes a reverse osmosis step, a deionization step for treating unpurified water from the reverse osmosis step and conventional water purification pretreatment step and water post-treatment steps associated with the reverse osmosis step. Water to be purified under pressure is contacted with a reverse osmosis membrane under conditions such that between about 5 and 50 volume percent of the incoming water is passed through the membrane while the remaining water comprises unpurified water is directed to a deionization step to produce deionized water. When less than about 5 percent of the incoming water is passed through the reverse osmosis membrane, the process becomes uneconomical. When greater than about 50 volume percent of the water is passed through the membrane, the membrane becomes degraded rapidly due to a high build-up of impurities such as scale or colloidal matter on the membrane, thus rendering it nonusable for its intended purpose.

In contrast to prior art processes, the process of this invention utilizes a deionization step not as a post-treatment step for purified water but rather utilizes a deionization step to treat reject or unpurified water from the reverse osmosis step. The deionized water produced from the deionization step is recycled either alone or in admixture with incoming feed water to the reverse osmosis step. The purified water reduces the burden on the reverse osmosis step for separating ionic species from the water so that the reverse osmosis step can be operated at higher throughput rates than normal throughput rates while avoiding reverse osmosis membrane plugging. In addition, by utilizing the reverse osmosis step subsequent to the deionization step, any impurities introduced into the water by deionization resin beads are removed by the reverse osmosis step. If the deionization step were positioned subsequent to the reverse osmosis step, these impurities would not be removed from the water. Most importantly, the entire process can be effected while conserving at least about 80% of the incoming feed water. In the process of this invention, less than about 20% of the incoming feed water is directed to waste.

Figure 1:
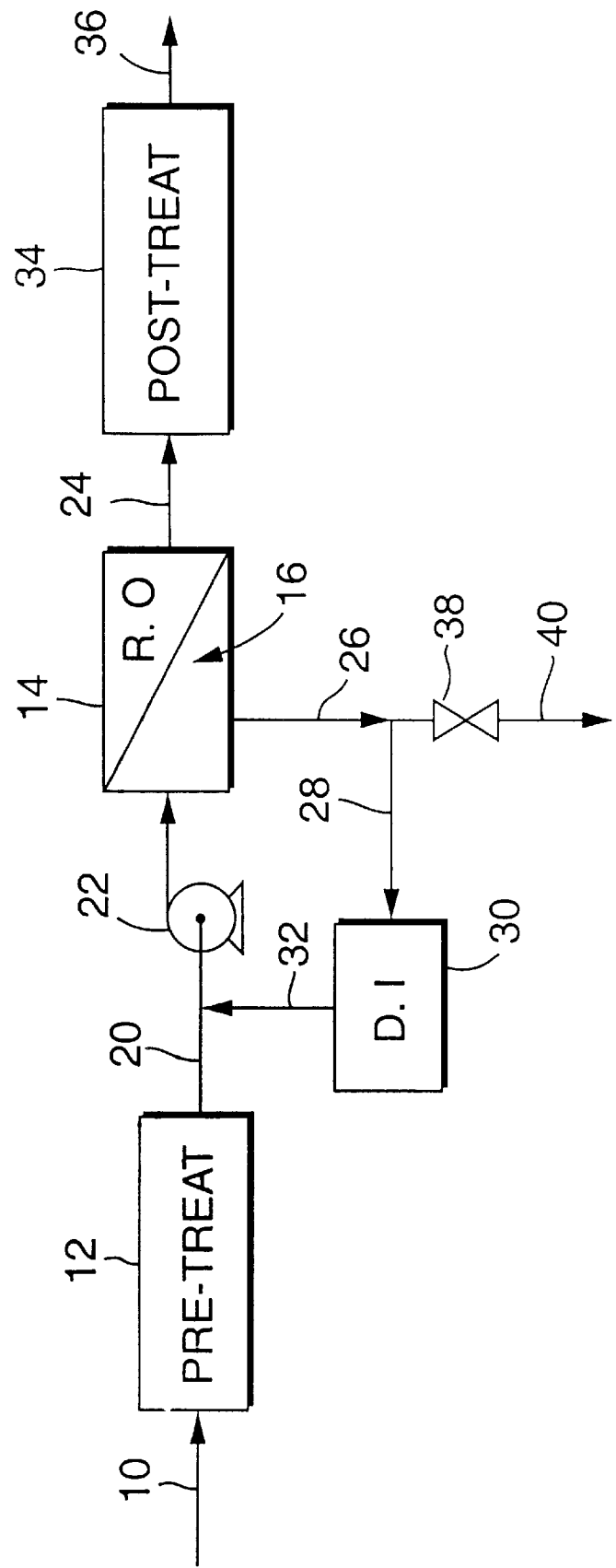
FIG. 1 Illustrates the process of this invention.

Referring to FIG. 1, water to be purified such as tap water is introduced through conduit 10 into pretreatment step 12 which can comprise one or a plurality of water purification steps designed to reduce the purification requirements of the downstream reverse osmosis step 14 and to minimize fouling of the reverse osmosis membrane 16. Typical pretreatment steps include, but are not limited to, prefiltration and adsorption with activated carbon and/or ion exchange resin. The pretreated water is directed through conduit 20 to pump 22 where it is pressurized and introduced into reverse osmosis step 14. Purified water is removed through conduit 24 while waste water under pressure is removed through conduit 26. Waste water is directed through conduit 28 to deionization step 30 wherein the water is contacted with ion exchange resin to replace ions in solution with hydrogen and hydroxyl ions to form purified water which is directed through conduit 32 to conduit 20 and then to reverse osmosis step 14. The purified water can be recycled to the reverse osmosis step 14 alone or in admixture with water in conduit 20 exiting pretreatment step 12. Purified water from the reverse osmosis step 14 is directed through conduit 24 to post-treatment step 34 which can be an ultrafiltration step or treatment with a combination of activated carbon and strong acid and strong base Type I nuclear grade ion exchange resins or directed to storage. Purified water is removed through conduit 36. Type I nuclear grade ion exchange resin beads are highly crosslinked and do not introduce organic contaminants into the aqueous streams. Periodically, valve 38 is opened to remove unpurified water from the system through conduit 40. At the time that valve 38 is open, 100% of the water introduced in through conduit 10 is directed to drain. However, valve 38 is only open a small fraction of the total operating times, thus, over time only approximately 5–20% of the total water entering the system is sent to the drain.

The following examples illustrate the present invention and are not intended to limit the same.

EXAMPLE 1

The example illustrates the use of the system of FIG. 1 wherein the pretreatment comprised a prefilter of activated carbon and a 0.5 micron prefilter. The deionization step comprised mixed bed grade strong acid strong base resin beads (not tradename). The reverse osmosis membrane was a composite comprising a thin layer of polyamid on a polysulfone substrate. The results are shown in Tables 1 and 2.

TABLE 1

Daily Recovery for Reverse Osmosis Unit
USAGE

| | Specified | Maximum |
| --- | --- | --- |
| System Capacity (lpd) | 150 | 200 |
| Flow Rate (lph) | 10 | 10 |
| Hours Operation per Day | 15 | 20 |
| Hours per day-Flush | 9 | 4 |
| Flushes per Day, Average | 3.0 | 1.33 |
| Flush Flow Rate (lpm) | 1.8 | 1.8 |
| Flush Duration (min) | 5 | 5 |
| Waste per Flush (l) | 9 | 9 |
| Waste per Day (l) | 27.0 | 12.00 |
| Recovery | 85% | 94% |

TABLE 2

Overall Rejection
FEED

| | High | Very High |
| --- | --- | --- |
| Feed TDS (ppm $CaCO_3$) | 175 | 300 |
| Blended RO Feed (ppm $CaCO_3$) | 25 | 43 |
| RO Product @ 90% Rej (ppm $CaCO_3$) | 2.50 | 4.29 |
| % Rejection @ 90% | 98.57% | 98.57% |
| RO Product @ 95% Rej (ppm $CaCO_3$) | 1.25 | 2.14 |
| % Rejection @ 90% | 99.29% | 99.29% |

As shown in Table 1, the loss of water utilizing the system of FIG. 1 was 15% at the specified capacity of the reverse osmosis unit and 6% at the maximum capacity for the reverse osmosis unit. As shown in Table 2, the rejection of Ca CO3 was virtually complete.

Figure 2A:
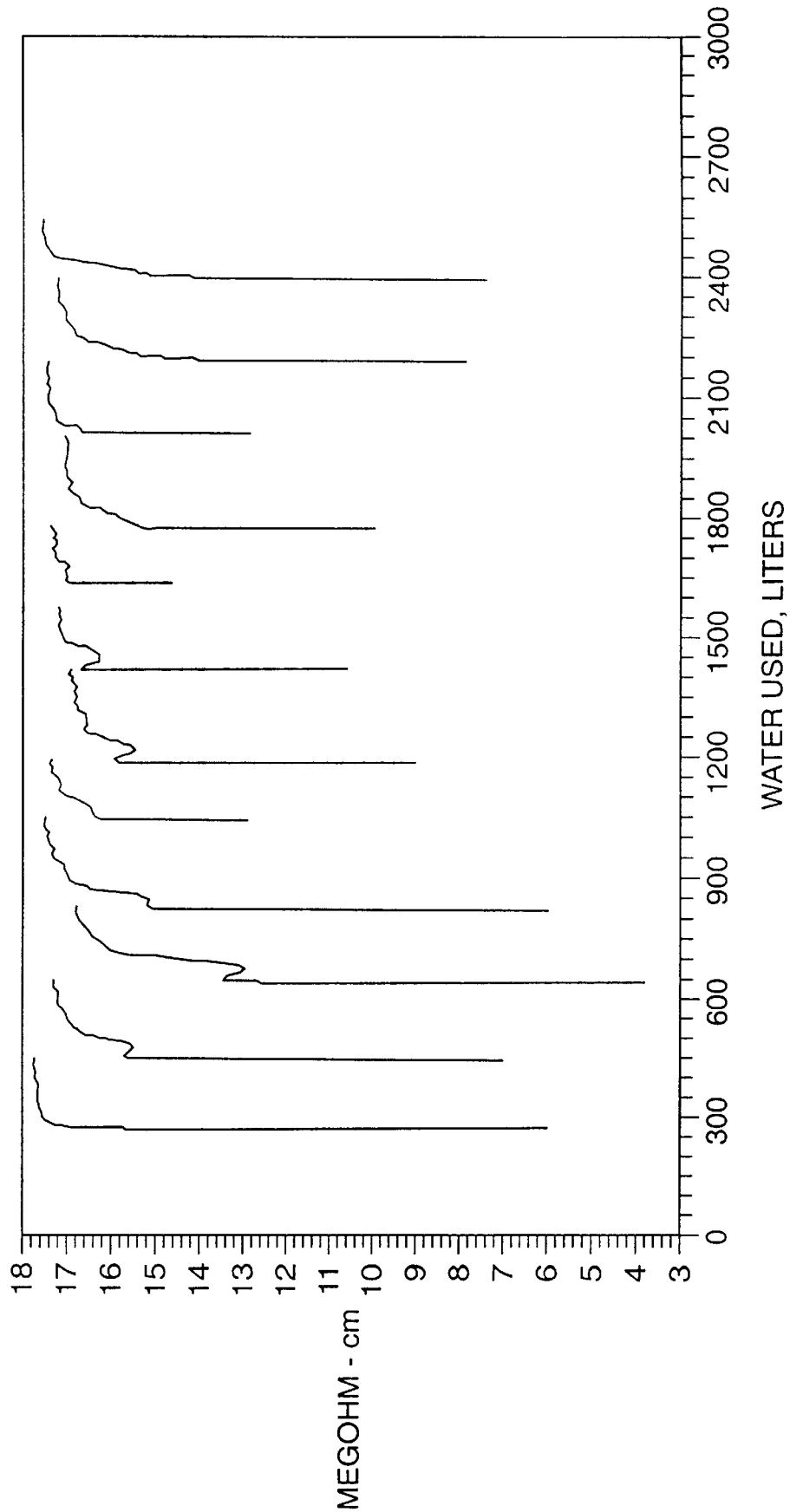
FIG. 2A shows the resistance of water produced by reverse osmosis and type I grade ion exchange resin.
Figure 2B:
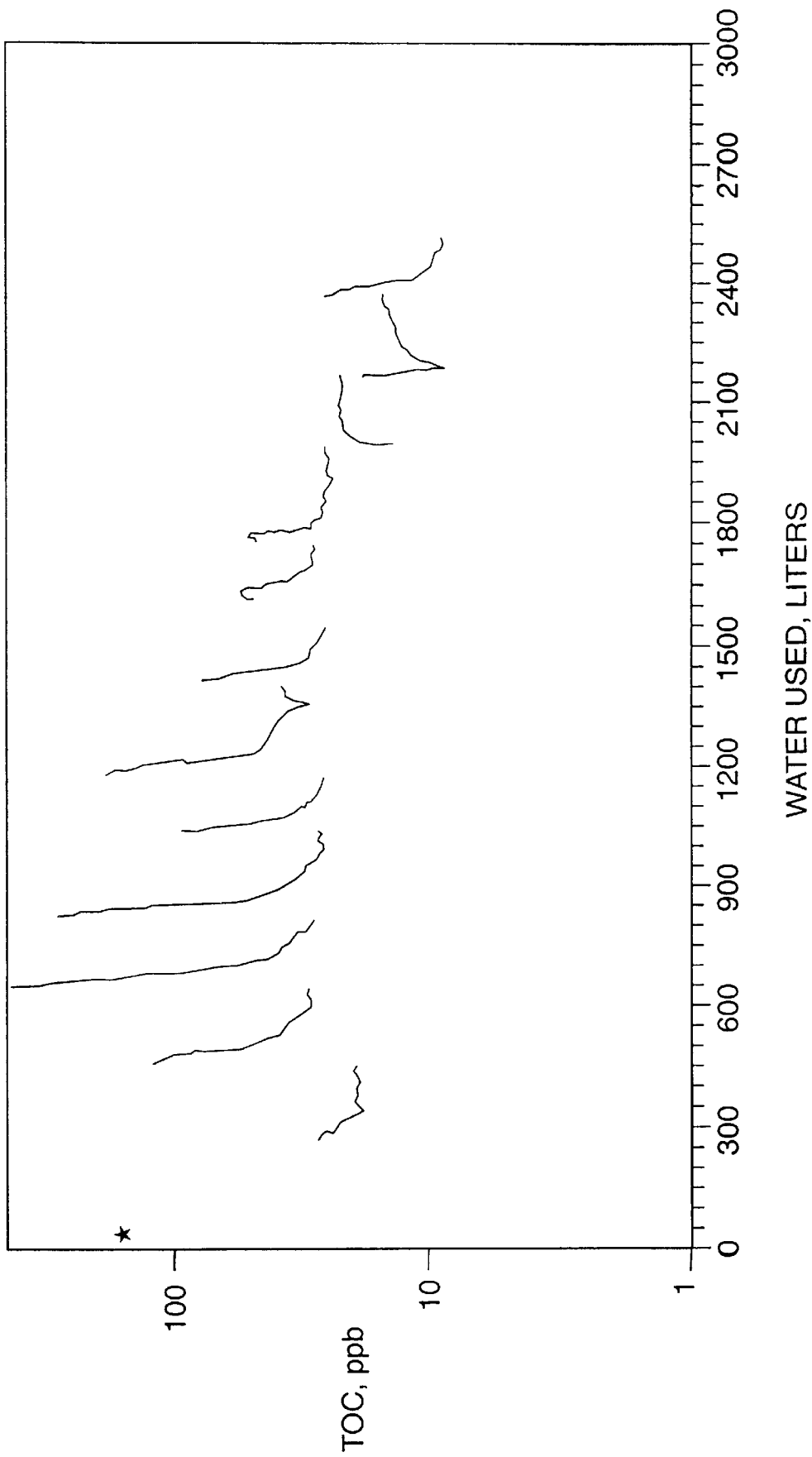
FIG. 2B shows total organic content (TOC) of the water illustrated in FIG. 2A.
Figure 3A:
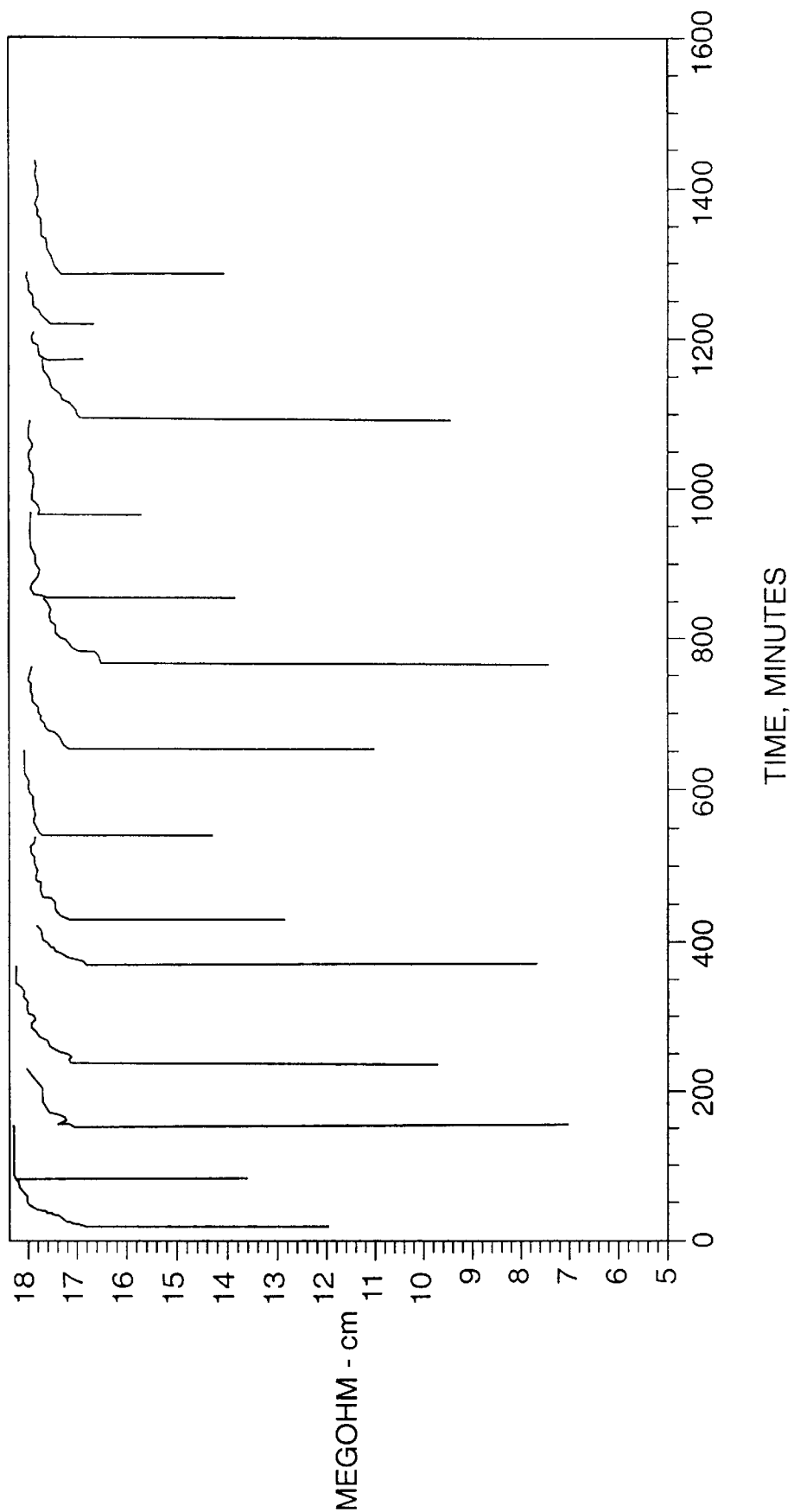
FIG. 3A shows the resistance of water produced by reverse osmosis and deionization and recycle as illustrated in FIG. 1 followed by treatment with activated carbon and Type I nuclear grade ion exchange resin.
Figure 3B:
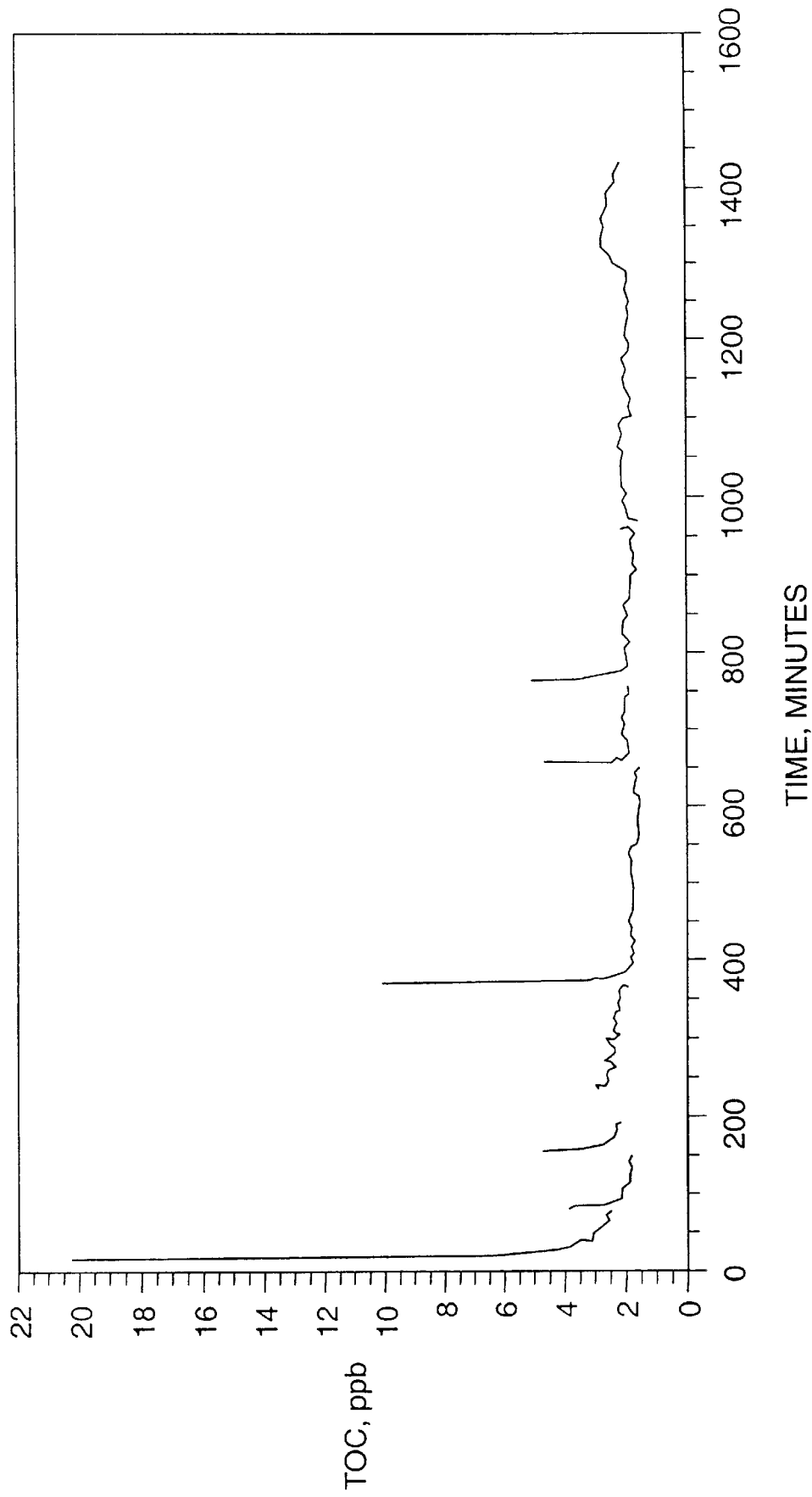
FIG. 3B shows the TOC of the water illustrated in FIG. 3A.

FIGS. 2A and 2B show the results of a process which includes reverse osmosis followed by deionization followed by a polishing step with activated carbon and a mixed bed strong acid and strong base Type I nuclear ion exchange resin beads. No recycle stream from the deionization step to the reverse osmosis step is utilized. FIGS. 3A and 3B show the results obtained with the same reverse osmosis membrane, deionization resin beads and polishing step as used to obtain the results shown in FIGS. 2A and 2B but with a recycle stream as illustrated in FIG. 1. The beads and reverse osmosis membrane are set forth above in this example. As shown in FIGS. 3A and 3B by utilizing the process of this invention 18 meg ohm water is rapidly produced which contains, in the order of about 2 ppb TOC. In contrast, as shown in FIGS. 2A and 2B, a process not employing a recycle stream produces a less resistant water containing far higher levels of TOC

We claim:

1. A system for purifying impure water which comprises means for effecting reverse osmosis of water including a reverse osmosis membrane, an inlet to said reverse osmosis membrane, a first outlet from said reverse osmosis membrane for purifed water passed through said reverse osmosis membrane, and a second outlet from said reverse osmosis membrane for waste water not passed through said reverse osmosis membrane, means for passing said waste water from said means for effecting reverse osmosis to a means for deionizing said waste water to produce a stream of purified deionized water, means for recycling said purified deionized water to said inlet to said reverse osmosis membrane and means for recovering a stream of purified water including said purified deionized water from said reverse osmosis membrane wherein said stream of purified water is passed through said reverse osmosis step only once.

2. The system of claim 1 including means for directing said purified water to a water post-treatment purifying step subsequent said means for effecting reverse osmosis.

3. The system of claim 1 which includes means for directing impure water to a water pretreatment purifying step prior to said means for effecting reverse osmosis, and means for directing a purified water stream from said pretreatment purifying step to said means for effecting reverse osmosis.

4. The system of claim 1 which includes means for directing said impure water to a water pre-treatment purifying step prior to said means for effecting reverse osmosis, means for directing a purified water stream from said pretreatment purifying step to said means for effecting reverse osmosis, and including means for directing said purified water to a water post-treatment purifying step subsequent said means for effecting reverse osmosis and prior to recovering said pure water.

5. A process for purifying impure water which comprises:

passing a stream of impure water through a reverse osmosis step including a reverse osmosis membrane to produce a first purified water stream and a waste water stream, passing said waste water stream to a means for deionizing water to produce deionized water, directing said deionized water to said reverse osmosis step to produce a second purified water stream, and recovering said first purified water stream and said second purified water stream wherein said first purified water stream and said second purified water stream are passed through said reverse osmosis membrane only once.

6. The process of claim 5 wherein said impure water is treated in a water purifying step prior to passing said water through said reverse osmosis step.

7. The process of claim 5 wherein said purified water is passed from said reverse osmosis step to a water purifying post-treatment step.

8. The process of claim 5 wherein said impure water is treated in a water purifying pre-treatment step prior to passing said water through said reverse osmosis step and in a water purifying post-treatment step subsequent said reverse osmosis step.

9. The process of any one of claims 5, 6, 7 or 8 wherein said purified deionized water is admixed with said impure water prior to said reverse osmosis step.

\* \* \* \* \*